US005744240A

United States Patent [19]

Lane et al.

[11] Patent Number: 5,744,240

[45] Date of Patent: Apr. 28, 1998

[54] BASECOAT COLOR SHIFT INHIBITOR

[75] Inventors: Matthew T. Lane, Bowling Green; David Braun, Whitehouse, both of Ohio

[73] Assignee: BASF Corporation, Mount Olive, N.J.

[21] Appl. No.: 755,133

[22] Filed: Oct. 4, 1996

[51] Int. Cl.[6] .................... B32B 9/04

[52] U.S. Cl. .................... 428/411.1; 428/423.1; 428/423.7; 428/424.2; 428/425.1; 428/480; 428/483; 428/485; 428/515

[58] Field of Search .................... 428/411.1, 423.1, 428/423.7, 424.2, 425.1, 480, 483, 485, 500, 507, 515

[56] References Cited

U.S. PATENT DOCUMENTS 5,157,100 10/1992 Babjak et al. .................... 528/73

OTHER PUBLICATIONS

Richard J. Lewis, Sr., Hawley's Condenced Chemical Dictionary, Twelfth Edition, p. 1076, 1993.

*Primary Examiner*—E. Rollins Buffalow

*Attorney, Agent, or Firm*—Michael R. Chipaloski

[57] ABSTRACT

An intermediate clear barrier coat is composed of at least one polymer or oligomer or combination in an aqueous or organic solvent carrier. This layer is placed between a basecoat layer containing pigment and a low VOC clearcoat layer and inhibits the components of the low VOC clear topcoat from inducing a shift of color in the basecoat.

3 Claims, No Drawings

BASECOAT COLOR SHIFT INHIBITOR

FIELD OF THE INVENTION

The present invention relates to the use of an intermediate layer of coating to inhibit color change in basecoat coatings resulting from penetration into and subsequent redissolution of said basecoat coatings by components in low VOC clearcoats.

BACKGROUND OF THE INVENTION

Basecoat/clearcoat finishes for vehicles have been used for several years and are now very popular. Benefiel et al U.S. Pat. No. 3,639,147 issued Feb. 1, 1972 and Kurachi et al U.S. Pat. No. 4,728,543 issued Mar. 1, 1988 show the application of a clearcoat to a basecoat in a "wet-on-wet" application, i.e., the clearcoat is applied before the basecoat is completely cured.

The basecoat imparts the desired color and effect while the clearcoat gives gloss and protection to the basecoat. The color and effect of the basecoat is chiefly a function of the pigments used. The pigments that are used in basecoats can be broadly classified into two categories: color and flake. Color pigments are organic and inorganic compounds which give the basecoat its shade, tone, hue, etc. Flake pigments are used to impart effects such as "flop" or "travel". Flop and travel are two of the many terms used to describe the phenomena in which the color of the coating changes as the viewing angle changes. Flop, in the case of aluminum flake, involves the changing of the lightness and darkness of the color. In the case of many mica-based flake pigments, the actual hue is directly affected. The desired flop effect is achieved when the flake pigments are properly oriented within the basecoat film, which occurs during the normal evaporative drying process.

In recent years, air quality regulations have mandated lower VOC coatings in the vehicle refinishing industry. Due to various performance limitations, low VOC water-borne clearcoats have yet to find their way into the vehicle refinishing marketplace. In clearcoats, high solids/solvent-borne has been the approach to low VOC that has gained commercial acceptance. However, as the VOC of solvent-borne clearcoats continues to be pushed downward, the clearcoat has a tendency to affect the color of the basecoat it is applied over.

When solvent-borne, low VOC clearcoats are applied over basecoats, there often results a significant difference in the color of the basecoat when in comparison to the same basecoat overcoated with a conventional VOC clearcoat. This color shift is most dramatic with basecoats containing flake pigments. The present invention relates to the application of a clear barrier coat, after basecoat application and prior to low VOC clearcoat application. The clear barrier coat acts to inhibit the redissolution of the basecoat's binder by the diluents and resins of the low VOC clearcoat, thereby helping to prevent the basecoat color from shifting. In the vehicle refinishing industry, thousands of color formulas are needed in order to match all available automotive and truck colors. Depending on the application and the desired properties, it is typical to have available several variations of clearcoats for use over a single basecoat line. It is imperative that these clearcoats do not significantly affect the color in the basecoat when in comparison to the standard clearcoat used in formulating the basecoat color matches. Reformulating thousands of basecoat color formulas in order to accommodate for color variations caused by an individual clearcoat is not practical.

The basecoat color shifting is known to be largely due to a disturbance of the flake pigment's orientation. This disturbance occurs when there is a significant redissolution of the binder in the basecoat by the components used to achieve the low VOC of the clearcoat. Typically, low viscosity reactive diluents are employed as a means to achieve low VOC coatings. These reactive diluents owe their low viscosity in large pan to a drastically reduced molecular size. As the molecular size is reduced, the reactive diluents begin to assume characteristics of volatile organic solvents, not only in viscosity, but also in ability to dissolve other resins. The combination of the diluent's solvency power, concentration, and contact time with the basecoat makes the redissolution of the binder in the basecoat possible. Examples of low VOC clearcoats which utilize reactive diluents are listed in U.S. patent application Ser. No. 451,373. and are incorporated by reference herein.

SUMMARY OF THE INVENTION

The present invention relates to a novel multi-layer coating composition. The multi-layer coating composition comprises:

a) a basecoat layer containing binder and pigment, b) a clear intermediate barrier coat layer, that inhibits the redissolution of the basecoat's binder, and c) a low VOC clearcoat comprising reactive diluents over said basecoat and intermediate layer.

The clear intermediate barrier coat, of the present invention, is comprised of:

a) at least one polymer or oligomer or combination thereof, and b) an aqueous or organic solvent carrier composition.

The polymers and oligomers of the clear intermediate barrier coating of the present invention can consist of any film forming resins that will result in the clear intermediate barrier coat inhibiting the redissolution of the basecoat binder. The clear intermediate barrier coat of the present invention does not in of itself cause the basecoat to shift in color.

Any substrate material can be coated with the coating composition according to the present invention. These substrate materials include such things as glass, ceramics, paper, wood and plastic. The coating composition of the present invention is particularly adapted for metal substrates, and specifically for use as a vehicle refinishing system. The substrate may be uncoated material or may be primed. The substrate may also be coated with paint products applied at the time of manufacture. The multi-layer coating composition may be applied using conventional spray equipment, high volume low pressure spray equipment or low volume low pressure spray equipment resulting in a high quality finish. The components of the compositions can be varied to suit the temperature tolerance of the substrate material. For example, the components can be constituted for air drying (e.g. less than 100° F.–180° F.), or higher temperature cure (e.g. over 180° F.).

DESCRIPTION OF THE INVENTION

The present invention relates to a novel multi-layer coating composition. The multi-layer coating composition comprises:

a) a basecoat layer containing binder and pigment, b) a clear intermediate barrier coat layer, that inhibits the redissolution of the basecoat's binder, and c) a low VOC clearcoat comprising reactive diluents over said basecoat and intermediate layer.

The clear intermediate barrier coat, of the present invention, is comprised of:

a) at least one polymer or oligomer or combination thereof, and b) an aqueous or organic solvent carrier composition.

The polymers and oligomers of the clear intermediate barrier coating of the present invention can consist of any film forming resins that will result in the clear intermediate barrier coat inhibiting the redissolution of the basecoat binder. The clear intermediate barrier coat of the present invention dries to a clear transparent film and is preferably applied in a thin layer of 2 to 15 μm, more preferably 2 to 8 μm, dry film thickness. It is desirable that the clear intermediate barrier coat be fast drying to avoid lengthening the time of repair beyond accepted practice. It is reasonable to assume that the dry time of the clear intermediate barrier coat should not exceed approximately thirty minutes before application of the low VOC clearcoat. The clear intermediate barrier coat of the present invention should not, in of itself, cause the basecoat to shift in color.

The film forming process of the clear intermediate barrier coat may be by lacquer dry, chemical crosslinking, or a combination thereof. The clear intermediate barrier coat can be deposited out of a conventional organic solvent carrier composition such as aliphatic and aromatic hydrocarbons, esters, glycol ethers, glycol ether esters, ketones, alcohols, etc. Illustrative of organic solvents of the above type which may be employed are alcohols such as ethanol, propanol, isopropanol and butanol; glycol ethers such as ethylene glycol monoethyl ether, ethylene glycol monobutyl ether, propylene glycol monomethyl ether, and dipropylene glycol monoethyl ether; glycol ether esters such as ethylene glycol monbutyl ether acetate, and propylene glycol monomethyl ether acetate; ketones such as methyl ethyl ketone, methyl n-butyl ketone, methyl n-amyl ketone, and methyl isobutyl ketone; esters such as n-butyl acetate, methoxy propyl acetate, hexyl acetate, and n-butyl propionate; aromatic hydrocarbons such as xylene and toluene; and aliphatic hydrocarbons such as heptane, mineral spirits, and V M & P naphtha. It is critical that the choice of evaporation rate and solvency power of the organic solvent carrier composition does not cause the clear intermediate barrier coat, in of itself, to shift the basecoat color. The clear intermediate barrier coat can also be deposited out of an aqueous carrier. These aqueous coatings usually contain a small amount of organic solvent as an aid to coalescing.

Examples of resins used in suitable lacquer dry coatings include nitrocellulose, cellulose acetate butyrate, acrylics, polyurethanes, and the like. Preferred are acrylics and polyurethanes.

Examples of functional groups used in suitable crosslinking coatings include, but are not limited to, active-hydrogen and isocyanate, epoxide and carboxylic acid, hydroxyl/carboxylic acid and urea-formaldehyde/melamine-formaldehyde, epoxide and amine, and oxidative cure. Oxidative cure coatings crosslink through free-radical reaction with carbon-carbon double bonds. Preferred functional groups are active-hydrogen and isocyanate.

Examples of suitable resins which contain aforementioned functional groups used in crosslinking coatings include, but are not limited to acrylics, polyesters, polyurethanes, polyureas, alkyds, amines, and epoxies. Preferred are acrylics, polyesters and polyurethanes. Most preferred are acrylics.

Additives of utility in the clear barrier coat are those commonly used in the art. Wetting agents and defoamers which find utility include but are not limited to Byk 141, Byk 304, Byk 306, Byk 307, Byk 325, Byk 331, Byk 341, Dow Corning #7, Dow Corning #54, Dow Corning #200, General Electric SF-69, Troy Chemical Troysol S366, Troy Chemical Troysol AFL, Tego Glide 410, Miles OL44.

Additives also finding utility are curing catalysts which include but are not limited to organic-metallic compounds such as dibutyltindioxide, dibutyltindilaurate, zinc octoate, amine compounds such as triethylamine, 2-diethylaminoethanol and triethylenediamine.

Also finding utility in these coatings are ultraviolet light absorbers and stabilizers which include, but are not limited to, Sandoz Chemicals Sanduvor 3206, Sanduvor VSU, Sanduvor 3050, Sanduvor 3055, Sanduvor 3058; Ciba Geigy Corp. Tinuvin 123, Tinuvin 292, Tinuvin 328, Tinuvin 384, Tinuvin 440, Tinuvin 900, Tinuvin 1130.

The basecoat layer comprises any suitable film-forming material conventionally used in this art including acrylics, alkyds, polyurethanes, polyesters, aminoplasts, cellulosics and waxes. The basecoat can deposited out of conventional volatile organic solvents such as aliphatic and aromatic hydrocarbons, esters, glycol ethers, glycol ether esters, ketones, alcohols, etc., or can be deposited out of an aqueous carrier.

The low VOC clearcoats are comprised of components according to U.S. patent application Ser. No. 451,373. These clearcoats contain low molecular weight imine reactive diluents, isocyanate functional resins, and may or may not contain hydroxyl bearing polymers such as acrylics and polyesters, and may or may not contain other active-hydrogen reactive diluents such as aspartatic esters. Although the low VOC clearcoats described herein are active hydrogen/isocyanate reacted systems, it is reasonable to expect that clearcoats utilizing other chemistries might contain components that would cause basecoat color shift. It is also reasonable to expect that the intermediate barrier coat of the present invention would effectively inhibit these clearcoats from causing said color shift. The description of the low VOC clearcoats of the present invention is not intended to limit the scope of the invention. The before-mentioned clearcoat systems can be formulated below 1.0 pound per gallon VOC, however, induced basecoat color shift has also been observed with clearcoats as high as 3.5 pounds per gallon VOC.

The following examples are for the purpose of illustrating the invention and are not intended in any way to limit the scope of the invention.

D VALUE

A measure of color difference. The D Value measurements were obtained using an X-Rite® MA60 Multi-Angle SpectroPhotometer manufactured by X-Rite, Incorporated, Grandville, Mich. The D Value is a compilation of the total color differences at all of the different chosen viewing angles. The larger the D Value, the larger the color difference between the standard coating and the batch coating.

R-M® DIAMONT™ BASECOAT

A solvent-borne basecoat coating used primarily in the automotive refinish industry. It is supplied by BASF Corporation, 24700 West Eleven Mile Road, Southfield, Mich., 48034. Information about R-M® Diamont™ Basecoat is contained in Technical Reference Manual #AD1069.

GLASURIT® GLASSOHYD® LINE-90 BASECOAT

A water-home basecoat coating used primarily in the automotive refinish industry. It is supplied by BASF Corporation, 24700 West Eleven Mile Road, Southfield, Mich., 48034. Information about Glasurit® Glassohyd® Line-90 Basecoat is contained in Technical Reference Manual #AD843G or Product Brochure #AD1018G.

R-M® DIAMONT™ DC76 TURBO CLEAR

Is an acrylic resin based clearcoat package. It is supplied by BASF Corporation, 24700 West Eleven Mile Road, Southfield, Mich., 48034. Information about R-M® Diamont™ DC76 Turbo Clear is contained in Technical Reference Manual #AD 1069 or in Technical Bulletin #AD 1153.

DESMOPHEN XP-7076

An aldehyde blocked amine reactive diluent supplied by Bayer Corporation, Pittsburgh, Pa.

DESMOPHEN XP-7052E

A secondary amine functional aspartic ester reactive diluent supplied by Bayer Corporation, Pittsburgh, Pa.

LUXATE® HD0100

An aliphatic isocyanate supplied by Olin Corporation, Cheshire, Conn.

DESMODUR XP-7100

An aliphatic isocyanate supplied by Bayer Corporation, Pittsburgh, Pa.

NEOCRYL® A-622

A water-borne acrylic resin supplied by Zeneca Incorporated, Wilmington, Mass.

TINUVIN® 384

A benzotriazole ultraviolet light absorber supplied by Ciba-Geigy Corporation, Hawthorne, N.Y.

TINUVIN® 292

A hindered amine light stabilizer (HALS) supplied by Ciba-Geigy Corporation, Hawthorne, N.Y.

BYK 331

A polysiloxane additive use to improve mar and slip. Supplied by Byk-Chemie, Wallingford, Conn.

BYK 358

A polyacrylate additive used to reduce cratering tendency. Supplied by Byk-Chemie, Wallingford, Conn.

EXAMPLE 1

Diamont Basecoat bases were mixed to match BMW-292 Samana Beige Metallic. Reducer was then added and stirred to bring the basecoat mixture to the proper spray viscosity. The ready-for-use basecoat was then spray applied to hiding over pre-primed panels using an automatic spray machine. The applied basecoat films were allowed to flash a sufficient time for the solvents to evaporate from the basecoat, which is typically at least 15 minutes. Then to panel A a barrier coat was spray applied which consisted of a thin film of Neocryl A-622. No barrier coat was applied to panel B. After approximately twenty-five minutes flash off, the following 1.0 lb./gal. VOC clearcoat coating was spray applied in one coat using an automatic spray machine.

| | Parts by weight |
|---|---|
| Desmophen XP-7076 | 38.8 |
| Desmophen XP-7052E | 42.9 |
| Ethyl acetate | 17.4 |
| Byk 331 | 0.1 |
| Byk 358 | 1.1 |
| Tinuvin 384 | 3.8 |
| Tinuvin 292 | 3.8 |
| Luxate HD0100 | 45.0 |
| Desmodur XP-7100 | 45.0 |
| Heptanoic acid | 3.2 |
| Total | 200 |

The clearcoat films were allowed to cure and the D values were determined against a standard color panel of BMW-292.

Basecoat film thickness=13 microns

Clearcoat film thickness=58 microns

Barrier coat film thickness for panel A=12 microns

| | Panel A (with barrier coat) | Panel B (without barrier coat) |
|---|---|---|
| D Value | 5.1 | 24.5 |

EXAMPLE 2

A barrier coat reducer was made by blending the following ingredients together.

| | Parts by weight |
|---|---|
| Aromatic 100 | 5.89 |
| N-Butyl Acetate | 62.08 |
| Propylene glycol monomethyl ether acetate | 13.02 |
| HiFlash VM&P Naphtha | 16.00 |
| Ethylene Glycol Monobutyl Ether Acetate | 3.00 |
| Total | 100 |

A barrier coat was made by blending the following ingredients together.

| | Parts by volume |
|---|---|
| DC76 Turbo Clear | 3 |
| DH15 | 1 |
| Barrier Coat Reducer | 16 |
| Total | 20 |

The ready-for-use Diamont Basecoat of Example 1 was spray applied to hiding over preprimed panels using an automatic spray machine. The applied basecoat films were allowed to flash a sufficient time for the solvents to evaporate from the basecoat, which is typically at least 15 minutes. Then to panel A the barrier coat of Example 2 was spray applied to a thin film.

No barrier coat was applied to panel B. After approximately three minutes flash off, the 1.0 lb./gal. VOC Clearcoat Coating of Example 1 was spray applied in one coat using an automatic spray machine.

The clearcoat films were allowed to cure and the D values were determined against a standard color panel of BMW-292.

Basecoat film thickness=13 microns

Clearcoat film thickness=58 microns

Barrier coat film thickness for panel A=5 microns

| | Panel A (with barrier coat) | Panel B (without barrier coat) |
|---|---|---|
| D Value | 16.6 | 24.5 |

EXAMPLE 3

The ready-for-use Diamont Basecoat of Example 1 was spray applied to hiding over pre-primed panels using an automatic spray machine. The applied basecoat films were allowed to flash a sufficient time for the solvents to evaporate from the basecoat, which is typically at least 15 minutes.

Then to panel A the following barrier coat was spray applied to a thin film:

| | Parts by volume |
|---|---|
| DC76 Turbo Clear | 1 |
| Acetone | 4 |
| Total | 5 |

No barrier coat was applied to panel B. After approximately three minutes flash off, the 1.0 lb./gal. VOC clearcoat coating of Example 1 was spray applied in one coat using an automatic spray machine.

The clearcoat films were allowed to cure and the D values were determined against a standard color panel of BMW-292.

Basecoat film thickness=13 microns
Clearcoat film thickness=58 microns
Barrier coat film thickness for panel A=5 microns

| | Panel A (with barrier coat) | Panel B (without barrier coat) |
|---|---|---|
| D Value | 5.1 | 24.5 |

EXAMPLE 4

Glassohyd Line-90 bases were mixed to match Toyota 862/500 Ice Blue Metallic. The ready-for-use basecoat was then spray applied to hiding over pre-primed panels using an automatic spray machine. The applied basecoat films were allowed to flash a sufficient time for the water and solvents to evaporate from the basecoat, which is typically at least thirty minutes. Then to panel A a barrier coat was spray applied which consisted of a thin film of Neocryl A-622. No barrier coat was applied to panel B. After approximately twenty-five minutes flash off, the 1.0 lb./gal. clearcoat of Example 1 was spray applied in one coat using an automatic spray machine.

The clearcoat films were allowed to cure and the D values were determined against a standard color panel of Toyota 862/500 Ice Blue Metallic.

Basecoat film thickness=15 microns
Clearcoat film thickness=59 microns
Barrier coat film thickness for panel A=8 microns

| | Panel A (with barrier coat) | Panel B (without barrier coat) |
|---|---|---|
| D Value | 10.2 | 14.1 |

EXAMPLE 5

The ready-for-use Glassohyd Line-90 basecoat of Example 4 was spray applied to hiding over pre-primed panels using an automatic spray machine. The applied basecoat films were allowed to flash a sufficient time for the solvents to evaporate from the basecoat, which is typically at least 30 minutes. Then to panel A the barrier coat of Example 2 was spray applied to a thin film.

No barrier coat was applied to panel B. After approximately three minutes flash off, the 1.0 lb./gal. VOC clearcoat coating of Example 1 was spray applied in one coat using an automatic spray machine.

The clearcoat films were allowed to cure and the D values were determined against a standard color panel of Toyota 862/500 Ice Blue Metallic.

Basecoat film thickness=15 microns
Clearcoat film thickness=59 microns
Barrier coat film thickness for panel A=3 microns

| | Panel A (with barrier coat) | Panel B (without barrier coat) |
|---|---|---|
| D Value | 14.3 | 14.1 |

EXAMPLE 6

The ready-for-use Glassohyd Line-90 basecoat of Example 4 was spray applied to hiding over pre-primed panels using an automatic spray machine. The applied basecoat films were allowed to flash a sufficient time for the solvents to evaporate from the basecoat, which is typically at least 30 minutes. Then to panel A the barrier coat of Example 3 was spray applied to a thin film.

No barrier coat was applied to panel B. After approximately three minutes flash off, the 1.0 lb./gal. VOC clearcoat coating of Example 1 was spray applied in one coat using an automatic spray machine.

The clearcoat films were allowed to cure and the D values were determined against a standard color panel of Toyota 862/500 Ice Blue Metallic.

Basecoat film thickness=13 microns
Clearcoat film thickness=59 microns
Barrier coat film thickness for panel A=3 microns

| | Panel A (with barrier coat) | Panel B (without barrier coat) |
|---|---|---|
| D Value | 9.7 | 14.1 |

We claim:

1. A multi-layer coating composition comprising:
   a) a basecoat layer containing binder and pigment,
   b) a clear intermediate barrier coat layer comprising at least one polymer, oligomer or combination thereof in a carrier composition, and
   c) a low volatile organic content clearcoat containing reactive diluents and having a volatile organic content of from about 0.1 to 3.5 pounds per gallon, and wherein, said clearcoat is applied over said basecoat and said clear intermediate layer.

2. The composition of claim 1 wherein the carrier composition is aqueous.

3. The composition of claim 1 wherein the carrier composition is organic.

* * * * *